United States Patent [19]
Altman

[11] 3,778,142
[45] Dec. 11, 1973

[54] LOW PROFILE EPISCOPIC PROJECTOR AND OPAQUE MATERIALS THEREFOR

[75] Inventor: Gerald Altman, Newton Centre, Mass.

[73] Assignee: Norsid Industries, Inc., Waltham, Mass.

[22] Filed: Oct. 19, 1970

[21] Appl. No.: 81,987

Related U.S. Application Data

[63] Continuation-in-part of Ser. Nos. 780,313, Dec. 2, 1968, abandoned, and Ser. No. 742,423, July 3, 1968, Pat. No. 3,614,199.

[52] U.S. Cl............... 353/44, 161/6, 350/105, 353/65, 353/66, 353/120
[51] Int. Cl................. G03b 21/132, G03b 21/06
[58] Field of Search .............. 353/65, 66, 44, 45, 353/120; 161/3.5, 4, 6; 350/105, 109

[56] References Cited
UNITED STATES PATENTS

| | | | |
|---|---|---|---|
| 3,511,566 | 5/1970 | Gold | 353/65 |
| 3,076,377 | 2/1963 | Bronnscombe | 353/102 |
| 3,486,817 | 12/1969 | Hübner | 353/99 |
| 3,405,025 | 10/1968 | Goldman | 161/4 |
| 3,357,300 | 12/1967 | Cornell | 353/22 |
| 3,249,002 | 5/1966 | Roop | 353/45 |

Primary Examiner—Louis R. Prince
Assistant Examiner—Steven L. Stephan
Attorney—Morse, Altman & Oates

[57] ABSTRACT

A portable episcopic projector, in which the presence of elevated optics in front of the screen is avoided, uses opaque sheeting that is adapted to receive related graphic matter on its upper and lower faces. Simultaneously, the upper face is unobstructedly available for direct observation and manual access, and the lower face is unobtrusively available for image projection through a folded optical path below the opaque sheeting and a projection lens at the side of the projector.

4 Claims, 13 Drawing Figures

3,778,142

LOW PROFILE EPISCOPIC PROJECTOR AND OPAQUE MATERIALS THEREFOR

RELATED APPLICATIONS

The present invention is a continuation-in-part of patent application Ser. No. 780,313, filed Dec. 2, 1968 in the name of the applicant hereof for Overhead Projector With Fresnel Reflector Stage, now abandoned, and a continuation-in-part of patent application Ser. No. 742,423, filed July 3, 1968 in the name of the applicant hereof for Reflux Reflecting Products, Processes and Devices Useful with such Products, now U.S. Pat. No. 3,614,199.

BACKGROUND AND SUMMARY

The present invention relates to optical imaging and, more particularly, to systems, processes and products involving episcopic imaging, i.e., imaging utilizing light generally reflected from or at a copy sheet or other visual subject, as distinguished from diascopic imaging, i.e., imaging utilizing light generally directed through a copy sheet. The immediately following discussion for simplicity is directed primarily to large copy projectors, exemplified by so-called "overhead" and "opaque" projectors, although it is to be understood that the concepts are more broadly applicable. Diascopic overhead projectors have been characterized by: bulky hardware that obtrudes between the audience and the projected image an causes the operator to assume an unnatural posture in order not to obtrude between the projection lens and the screen, and transparencies that are uncomfortable for the operator to view, handle and store. Episcopic overhead projectors theoretically are more compact than diascopic overhead projectors because illuminating source and imaging lens are at the same side of the copy sheet, whereby vertical dimensions are reduced. But, in practice, episcopic overhead projectors also have been obtrusive because either (1) the light source and imaging lens are positioned by a post in a sizeable casing above the copy sheet or (2) a bulky housing envelops the light paths to and from the copy sheet in order to control glare. Episcopic copy, when capable of brilliant projection, is characterized by plastic sheeting that lacks the desirable feel of paper and that suffers from glare produced at the air-plastic interfaces. Episcopic copy, when composed of paper or sheeting of equivalent "feel," has not been adapted for brilliant imaging because of its optical diffusivity.

The primary objects of the present invention are the provision of systems, processes and products involving a portable projector and a copy sheet assemblage that are particularly interrelated to achieve, during projection, direct visual and manual access to the copy sheet by the operator, absolute shielding of the operator and the audience from illuminating light, no interposition of the optical projection system above the level of the copy sheet between the audience and the screen, and natural posture of the operator at the projector. The optical projector comprises a low profile housing in which are positioned an upper window for supporting the copy sheet with its front face upward for direct viewing, a source of illuminating light from which the exterior of the housing is absolutely shielded by the copy sheet itself, and a folded optical path below the window to an imaging lens at the side of the projector. The arrangement is such that an unusually powerful illuminating lamp is practicable. The copy sheet either is an ordinary opaque print that overlaps the edges of the window or a special opaque print that is particularly adapted for use with the above described projector. The opaque copy sheet, for example, may be: a paper print of any size backed by an opaque sheet that is large enough to overlap the edges of the window; a plastic transparency that is reflectively metallized at one face or that is backed by a reflectively metallized plastic sheet; or a reflex reflecting sheet.

Other objects of the present invention are to provide systems, processes and products, involving: writing with a reactive ink on a sheeting having an aluminized plastic interface in order to simultaneously produce visual copy in terms of a light absorbing medium and projection copy in terms of etching in the aluminized plastic interface; substituting a second subject for a first during projection by superposing the second upon the first and withdrawing the first from beneath the second.

Other objects of the present invention will in part be obvious and will in part appear hereinafter.

The invention accordingly comprises the systems, processes and products, together with their components, steps, parts and interrelationships, which are exemplified by the present disclosure, the scope of which will be indicated in the appended claims.

BRIEF DESCRIPTION OF DRAWINGS

For a fuller understanding of the nature and objects of the present invention, reference is made to the following detailed description, taken in connection with the accompanying drawings, wherein.

DETAILED DESCRIPTION

Figure 1:
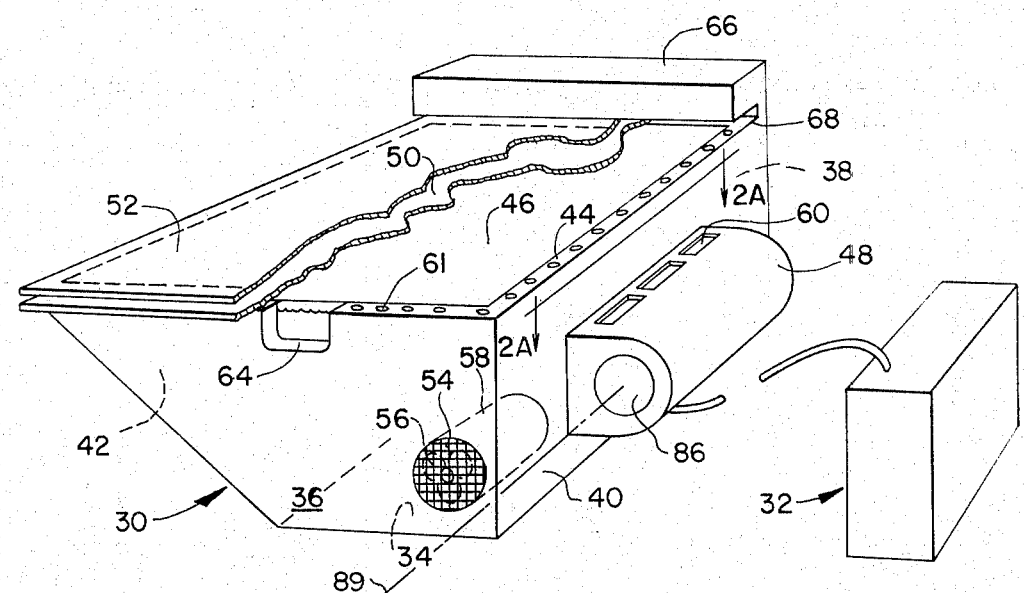
FIG. 1 is a perspective view of a large opaque copy projector embodying the present invention.

A large copy projector embodying the present invention, i.e., for copy greater than 6 × 6 inches in area, is shown in FIG. 1 as including a primary housing 30, which mounts and contains the optical operating components, and an optional secondary housing 32, which mounts and encloses a power supply, to be discussed below. As shown, housing 30 is in the form of a sheet metal enclosure having a base panel 34, a front panel 36, a rear panel 38, a right panel 40, and a left panel 42. Panel 34 is generally horizontal, panels 36, 38 and 40 are generally vertical and panel 42 is generally oblique, extending from base panel 34 upwardly and outwardly to the top of the housing. At the top of the housing is a peripheral lip 44 which encompasses an optically clear glass or plastic window 46, the upper face of which is flat and the lower face of which has a Fresnel lens configuration. Extended outwardly from panel 40 is a casing 48, which encloses an illuminating lamp 78 and a projection lens 86. As shown at 50, an opaque copy sheet when superposed on window 46, presents an upper face for direct observation and a lower face for imaging by lens 86 on a screen. The arrow 89 indicates the projection axis of imaging light, which is directed to an upright screen perpendicular to the projection axis. In front face 36 is a vent 54, which is light shielded by suitable baffles. At vent 54 is a fan 56 which is driven by a motor 58 in such a way as to draw air into the housing (1) through a series of cooling ports 60 in order to maintain the correct temperature at the illuminating lamp and (2) through a series of vents 61 in lip 44, which serve to create suction by which the edges of copy 50 are retained in position in window 46.

Figure 3:
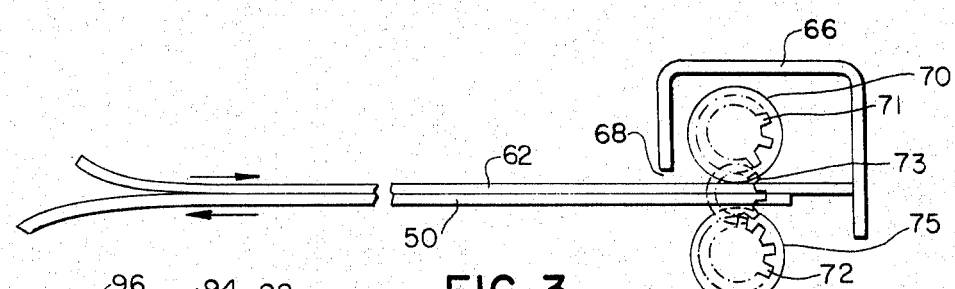
FIG. 3 is a detail view of a mechanism of the projector of FIG. 1, illustrating its operation in connection with an exchange of copy sheets in accordance with the present invention.

Replacing an initial copy sheet 50 by a new copy sheet 52 merely involves superposing copy sheet 52 upon copy sheet 50 and, while copy sheet 52 is held in place above window 46, withdrawing copy sheet 50 from between copy sheet 52 and window 46. A notch 64 at the upper front edge of the housing facilitates this procedure, when accomplished manually. A mechanism for optionally facilitating exchange of copy sheets is positioned within an elongated casing 66 at the rear of window 46. The interior of casing 66 is accessible to the rear edge of copy sheet 50 and copy sheet 52 through a slot 68. As seen in FIG. 3, within casing 66 are a pair of rubber rolls 70, 72, which are rotatable about horizontal axes that are generally parallel to the plane of window 46. Rolls 70, 72 are controlled by a gear train 71, 73, 75 so that rolls 70, 72, when actuated, both rotate in a counter-clockwise direction to slide the rear edge of any upper copy sheet 52 into the nip between the rolls and to slide the rear edge of any lower copy sheet 50 out of the nip between the rolls. Thus, when a copy sheet being projected is to be exchanged for a new copy sheet, it only is necessary to insert the forward edge of the new copy sheet into the nip between the rolls and to actuate the rolls. In consequence, the new copy sheet becomes locked firmly in position with its edge in the nip between the rolls and the old copy sheet is ejected from the nip between the rolls so that its rear-ward edge may be gripped between the fingers for removal from its position above window 46 and for exposure to illuminating light of the underside of the new copy sheet.

Figure 2:
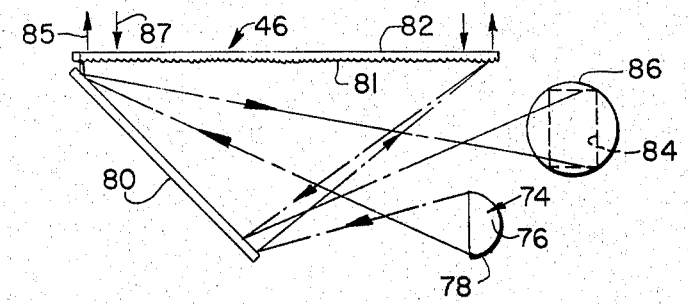
FIG. 2 is a schematic view of the optical system of FIG. 1.
Figure 2A:
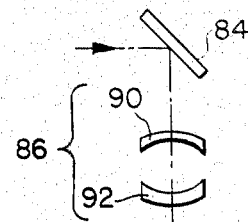
FIG. 2A is a cross-sectional view of FIG. 1, taken along the line 2A—2A.

The optical system of the projector of FIG. 1 is shown in FIG. 2. A lamp 74 has a filament 76 and an ellipsoidal reflector 78 with a pair of foci, at one of which is disposed incandescent filament 76. Illuminating light from lamp 74 is directed to a plane mirror 80, at a 45° angle to window 46, which has a lower Fresnel configuration 81 and a smooth upper face 82. As suggested by arrows 85, 87, light rays emerging upwardly through window 46 are parallel and light rays returned by a specular reflecting under face of copy sheet 50 are parallel. In consequence, the returned light is directed via oblique mirror 80 to an oblique mirror 84 for imaging via lens 86. In the form shown, lens 86 comprises a meniscus duplet 90, 92, which has been selected for its combination of low cost and relatively wide field angle. It will be observed that the light path of the illuminating and imaging light includes an axis segment below window 46 that is parallel to the planes of window 46 and the viewing screen and that is transverse to the direction of the axis of projection lens 86.

Figure 4:
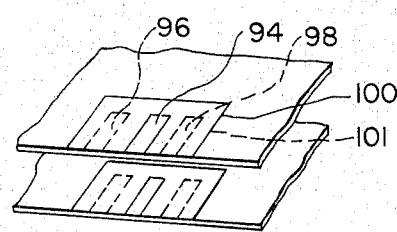
FIG. 4 is a fragmentary, perspective view illustrating details of certain copy sheets in accordance with the present invention.

In a modification of the overhead projector of FIG. 1, rear casing 66 and rolls 70, 72 are omitted. Instead, as shown in FIG. 4, the opposite faces of the forward and rearward edges of each copy sheet are provided with interrelated regions by which friction between adjacent superposed copy sheets is reduced and friction between fingers and selected portions of superposed copy sheets is increased. At the center of each edge, at one face is an elongated rectangular region 94 and at the other face are elongated rectangular regions 96, 98. All of regions 94, 96 and 98 are coated with a somewhat tacky elastomeric material that tends to adhere to fingers in contact therewith. These friction intensifying regions are surrounded by background regions 100, 101, which are coated with a silicone anti-friction material that does not tend to adhere to the tacky elastomeric material of regions 94, 96, 98. The arrangement is such that region 94 of a first copy sheet falls between regions 96, 98 of a second and is in contact with a friction reducing region of the second. When region 94 of a first copy sheet is contacted by an operator's thumb and regions 96, 98 of a second copy sheet are contacted by an operator's index finger, a slight relative movement of the thumb and index finger causes the lower copy sheet to slip from underneath the upper copy sheet so that it may be removed thereafter with ease.

Figure 5:
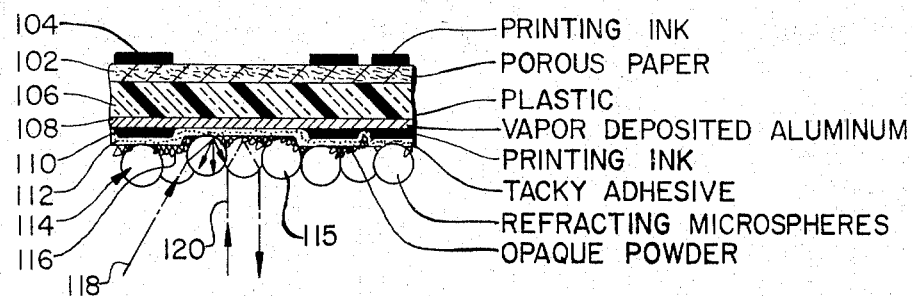
FIG. 5 is an exaggerated, cross-sectional view of a product embodying the present invention.

An integrated copy sheet of a type particularly adapted for use with the projector of FIG. 1 is shown in FIG. 5. This copy sheet comprises an upper print receiving stratum 102 which carries an outer visual medium 104, an inner support stratum 106 which is coated with a reflecting stratum 108 and carries a visual medium 110, and an optical control stratum 114 which is bonded to reflecting stratum 108 and visual medium 110 by an optically clear adhesive stratum 112. In one form, print receiving stratum 102 is composed of a porous material such as paper, visual medium 104 is an ink containing a pigment such as carbon in an organic vehicle, support stratum 106 is composed of a dimensionally stable polymer such as carbosymethyl cellulose or polyester resin, reflecting stratum 108 is composed of aluminum or silver that has been vacuum vapor deposited in a thickness ranging from 500 to 2,000 Angstrom units, visual medium 110 is an ink containing a pigment such as carbon in an organic vehicle, and adhesive stratum 112 is composed of a non-drying organic vehicle containing an elastomer. The optical control stratum includes, in contact with adhesive stratum 112, (1) a monolayer of closely packed, optically clear, refracting microspheres 115 and (2) opaque particles 116 of a light absorbing composition dispersed in the interslices among the microspheres to surround each microsphere with an opaque stop. Preferably 90 percent of the microspheres range from 25 to 100 microns in diameter and 90 percent of the particles range from 1 to 10 microns in diameter. The index of refraction of the microspheres preferably ranges from 1.8 to 2.0, being precisely chosen to define a focal plane at reflecting stratum 108. In a specific example of the product of FIG. 5, the dimensions are approximately as follows: porous paper stratum 102 is 0.001 inch thick; polymeric support stratum 106 is 0.003 inch thick; vapor deposited aluminum stratum 108 is 1,200 Angstrom units thick; adhesive stratum 112 is 2 microns thick; printed media 104, 110 each is 0.0005 inch thick; microspheres 115 on the average are 50 microns in diameter; and particles 116 on the average are 6 microns in diameter.

The arrangement is such that visual medium 104 may be viewed directly in terms of diffusely reflected light and visual image 110 may be projection imaged on a screen in terms of specularly reflected light. Since these images correspond, the operator and the audience see the same image at any time. When the rear face is directly observed, only light resulting from oblique rays 118 is capable of being returned to the eyes of the observer because rays directed normally toward the rear face are obscured by the head of the observer or completely miss the observer's head both in the incident and reflected directions. Such oblique rays strike particles 116, by which they are scattered, the result being reflection of diffuse light. On the other hand, when normal rays 120 are incident on the rear face, as when collimated by the Fresnel window of the projector of FIG. 1, these rays are focused by each microsphere on aluminum stratum 108 and returned by each microsphere in the normal direction from which they came. Properly focused, the result is a brillant projection image. By properly selecting the hue, chroma and value of visual medium 110 in reference to the hue, chroma and value of particles 116, the rear face of the copy sheet can be made to appear completely blank to the unaided eye notwithstanding the capability of visual medium 110 for brilliant projection.

Figure 6:
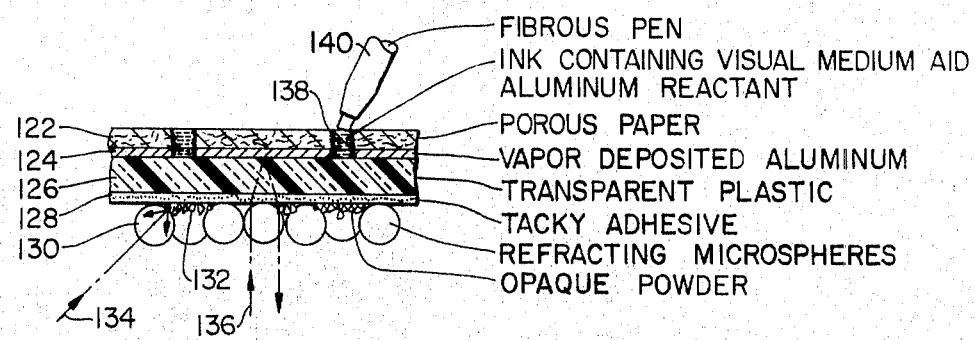
FIG. 6 is an exaggerated, cross-sectional view of an alternative product embodying the present invention.

The graphic product of FIG. 6 is capable of being normally marked to produce, simultaneously a visual record for direct observation from the front and for optical projection from the rear in conjunction with the projector of FIG. 1. This product, in laminated sequence, comprises a visual image receiving stratum 122, a specularly reflecting stratum 124, a polymeric support stratum 126, a tacky adhesive stratum 128, and an optical control stratum that includes a closely packed monolayer of microspheres 130 and an interspersed monolayer of light absorbing particles 132. The dimensions of the various strata and components of the product of FIG. 6 are analogous to the dimensions of the corresponding strata in the product of FIG. 5. Microspheres 130 are characterized by an index of refraction that is slightly less than 2.0, more specifically between 1.8 and 2.0, in order to focus incident light on the plane of reflecting stratum 124. The arrangement is such that obliquely incident rays 134 are diffusely reflected and normally incident rays 136 are specularly reflected. It will be observed that image receptive stratum 122 and aluminum reflecting stratum 124 are in contiguity. It has been found that a special ink 138, which may be applied from a fibrous pen 140, is capable of penetrating through image receptive stratum 122 to aluminum reflecting stratum 124 to leave a pigmented mark in image receptive stratum 122 and an etched mark through aluminum reflecting stratum 124.

In one form, ink 138 contains, in aqueous dispersion, a black pigment composed for example of carbon or iron oxide, and a polar reagent, for example, a base such as sodium hydroxide or ammonium hydroxide or an acid such as hydrochloric acid. In one modification, image receptive stratum 122 is impregnated with a catalyst such as an alkali carbonate. Ink 138, in another form, contains a dye such as a diazo dye or ferric ammonium oxalate, by which image receptive stratum 122 is marked for direct observation and aluminum reflecting stratum 124 is colored without etching to produce a specularly reflective colored mark for projection.

Figure 7:
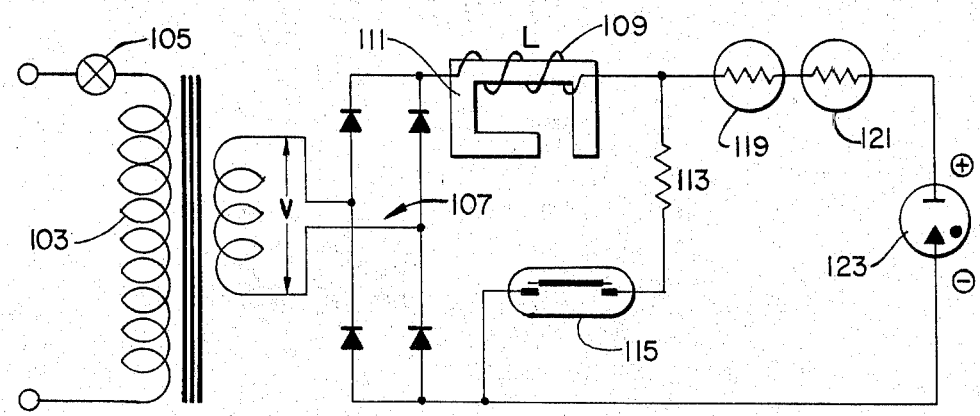
FIG. 7 is a schematic diagram of the electrical circuit of the projector of FIG. 1.

In a modification of the projector of FIG. 1 the illumination source is an arc lamp. An electrical schematic of the power pack contained in secondary housing 32 is shown in FIG. 7 as follows. Alternating current is applied to the primary of a transformer 103 when a line switch 105 is thrown. The power in the secondary is applied to a full wave rectifier 107. Now direct current flow through an inductor 109, which has an iron core 111, a resistor 113 and a vacuum switch 115. In consequence, a magnetic field is generated across the air gap of iron core 111, opening vacuum switch 115 and interrupting the current through resistor 113 in order to generate an inductive pulse which is applied across the lamp, shown at 123. An ionized path thereby is established across the electrodes of the lamp and normal arc current flows through inductor 109 and a pair of resistors 119, 121 so as to maintain vacuum switch 115 open and to limit the current flowing through the lamp.

Figure 8:
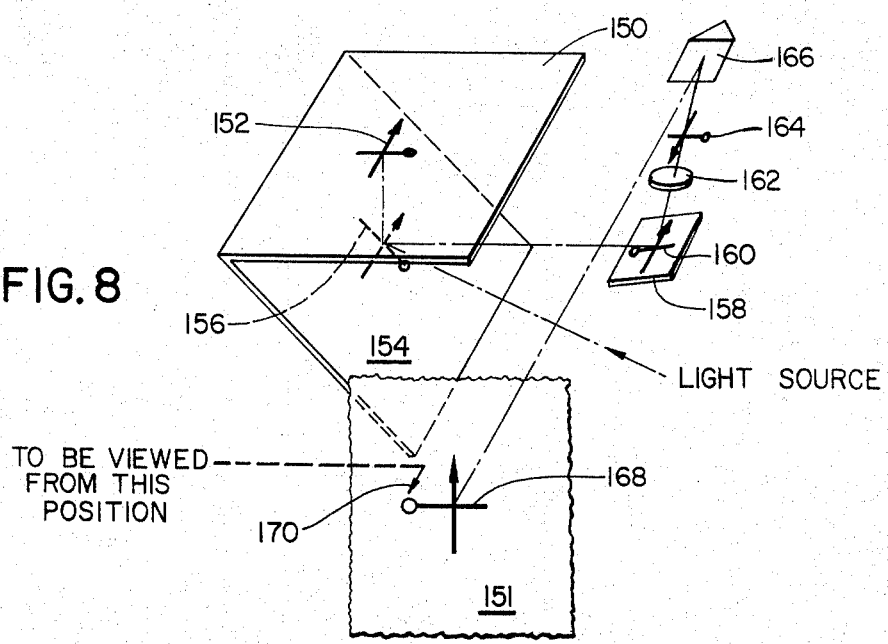
FIG. 8 is a perspective of a modification of the optical system of FIG. 2.

A modification of the optical system of FIG. 2 is shown in FIG. 8 as including a generally horizontal window 150 of the type described above as having an upper flat face and a lower refracting Fresnel configuration, a 45° mirror 154 for deflecting illuminating light toward copy on window 150 and for deflecting imaging light below window 150 along an axis in parallel with the window and with a screen 151, a second 45 degree mirror 158 for deflecting imaging light from mirror 154 in an upward direction perpendicular to the plane of window 150, parallel to screen 151 and at the side of window 150, an imaging lens 162, and a Amici roof prism 166, the front face and roof corner of which are at a 45 degree angle with respect to the vertically directed axis of lens 162. The image, shown at 152, which is directly observable from above and presents a reverted image from below, is reverted at 156, reverted at 160, inverted and reverted at 164 and inverted and reverted at 168. Projected image 168 is viewed on screen 151 in the direction indicated by arrow 170. This projected image 168 appears in exactly the same orientation as does original image 152 when viewed directly.

Figure 9:
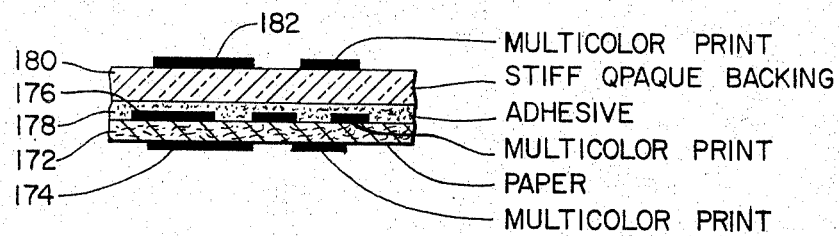
FIG. 9 is an exaggerated cross-sectional view of a product useful in the projector of FIG. 1.

The optical systems of FIGS. 1 and 8 are operable in connection with a variety of different types of products, some having ordinary diffusely reflecting faces for direct viewing and others having specularly reflecting faces for optical projection. The product of FIG. 9 is shown to be in the form of ordinary newsprint 172, the rear face of which has an ink pattern 176 and the forward face of which has an ink pattern 174. Newsprint 172 is bonded to the forward face of a stiff opaque backing sheet 180 by a suitable adhesive 178. Backing sheet 180 is imprinted on its upper face with an ink pattern 182 that in one form contains information regarding printed matter 174 for use by a direct observer.

Figure 10:
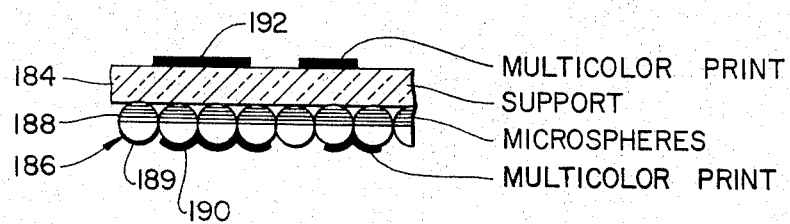
FIG. 10 is an exaggerated cross-sectional view of another product useful in the projector of FIG. 1.

The product of FIG. 10 is shown as including a paper or plastic support 184, and a monolayer of microspheres 186 each of which has a metallized inner reflecting hemispheric surface 188 and an exposed outer refracting hemispheric surface 189. An ink pattern 192 is imprinted on support 184 for direct observation and an ink pattern 190 is imprinted on microsphere stratum 186 for optical projection. Ink patterns 190, 192 correspond to and are registered with each other so that a viewer of the copy sheet and a viewer of the projection screen see analogous images.

Figure 11:
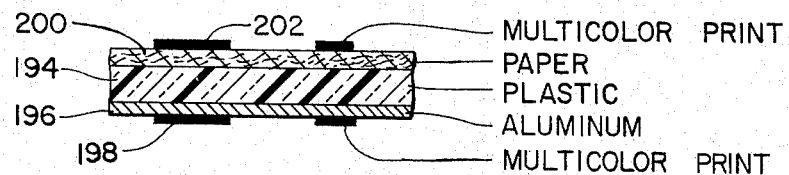
FIG. 11 is an exaggerated cross-sectional view of a further product useful in the projector of FIG. 1.

The product of FIG. 11 is shown as comprising an optically clear polymeric support stratum 194, a rearward aluminized reflecting stratum 196, and forward opaque, porous paper stratum 200. A multicolor ink pattern 198 is applied to stratum 196 and a multicolor ink pattern 202 is applied to stratum 200. Patterns 198, 202 are in mirror image correspondence so that an operator directly observing the front face of paper stratum 200 sees the same image as does an audience observing the projected image on the screen.

Figure 12:
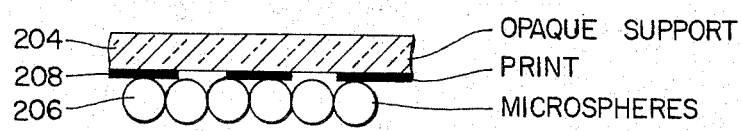
FIG. 12 is an exaggerated cross-sectional view of still another product useful in the projector of FIG. 1.

The product of FIG. 12 is shown as including an opaque paper support stratum 204 having at its rearward face an ink pattern 208 and, on the side of the printed matter remote from support 204, a refracting microsphere stratum 206. The presence of any microsphere tends to focus incident light onto a particular spot on support 204 and to return diffusely reflected light from that spot for projection. The total effect of the microspheres is a threefold increase of projection image intensity with respect to the analogous projection image intensity of a simply diffusing surface.

The present invention thus provides a variety of systems involving opaque projection, which ensure: simultaneous, direct optical and mechanical access to the subject by the operator; absolute shielding of the operator and the audience from illuminating light; no interposition of the optical system above the level of the subject between the audience and the screen; and natural posture of the operator at the projector. Since certain changes may be made in the foregoing disclosure, without departing from the scope of the invention hereof, it is intended that all matter described in the foregoing specification or shown in the accompanying drawings, be interpreted in an illustrative and not in a limiting sense.

What is claimed is:

1. A large copy optical projector capable of imaging a generally horizontal copy sheet on a generally vertical viewing screen spaced from said projector, said copy sheet having an upper face and a lower face, said lower face being reflectorized, said optical projector comprising:
   a. housing means defining an enclosed chamber, said housing means having a substantially horizontal upper portion, said upper portion having a first opening throughout a major portion of its area;
   b. a flat Fresnel lens at said opening in said upper portion, said Fresnel lens being substantially coextensive with said opening in said upper portion;
   c. said copy sheet, when releasably placed on said Fresnel lens, being substantially coextensive therewith and having substantially the entire upper face of said copy sheet accessible visually and manually to an operator;
   d. said housing means having a second opening, objective lens means at said second opening for receiving imaging light along an imaging path and defining a projection axis that is directed toward said generally vertical viewing screen;
   e. lamp means in said chamber for directing illuminating light along an illuminating path;
   f. an oblique plane mirror underlying said Fresnel lens within said chamber, an edge of said mirror being adjacent to an edge of said Fresnel lens;
   g. said illuminating light diverging in said illuminating path along a first illuminating axis communicating with said oblique plane mirror and then being reflected along a second illuminating axis communicating with said Fresnel lens;
   h. said imaging light reflected from said copy sheet being converged by said Fresnel lens in said imaging path along a first imaging axis communicating with said oblique plane mirror and then being reflected along a second imaging axis communicating with said objective lens means;
   i. said lamp means and said objective lens means being disposed at one side of said oblique plane mirror;
   j. said projection axis being disposed externally of the region directly overlying said Fresnel lens;
   k. said Fresnel lens directing substantially parallel illuminating light to said bottom face of said copy sheet and receiving substantially parallel imaging light from said bottom face of said copy sheet; and
   l. said chamber being substantially light tight with respect to stray light therewithin when said copy sheet is superposed on said Fresnel lens.

2. The large copy optical projector of claim 1, wherein aid means are provided for facilitating superposing of said copy sheet on said Fresnel lens.

3. The large copy optical projector of claim 1, wherein aid means are provided for facilitating a superposing said copy sheet on said Fresnel lens, said aid means constituting means for releasably holding said copy sheet against said Fresnel lens.

4. The large copy optical projector of claim 1, wherein said means are provided for facilitating superposing said copy sheet on said Fresnel lens, said aid means constituting means for releasing a first copy sheet superposed on said Fresnel lens while gripping a second copy sheet superposed on said first copy sheet.

* * * * *